United States Patent [19]  [11] 3,948,850
Hudgin  [45] Apr. 6, 1976

[54] STABILIZED ETHYLENE-CARBON MONOXIDE COPOLYMERS

[75] Inventor: Donald E. Hudgin, Princeton Junction, N.J.

[73] Assignee: Atlantic Richfield Company, Los Angeles, Calif.

[22] Filed: Aug. 29, 1974

[21] Appl. No.: 501,524

[52] U.S. Cl...... 260/45.7 P; 260/89.7 R; 260/94.9 B
[51] Int. Cl.².......................................... C08K 8/00
[58] Field of Search....... 260/45.7 P, 94.9 B, 89.7 R

[56] References Cited
UNITED STATES PATENTS

| 2,641,590 | | Little | 260/89.7 R |
|---|---|---|---|
| 3,629,378 | 12/1971 | Kodama | 260/45.7 P |
| 3,654,190 | 4/1972 | Levine | 260/45.7 P |
| 3,689,460 | 9/1972 | Nozaki | 260/94.9 B |

OTHER PUBLICATIONS

Handbook of Adhesives, "Skeist," 1962, p. 104 relied on.

Primary Examiner—Donald E. Czaja
Assistant Examiner—W. E. Packer
Attorney, Agent, or Firm—Coleman R. Reap

[57] ABSTRACT

Ethylene-carbon monoxide copolymer compositions are stabilized against thermal degradation by the incorporation therein of dihydrogen alkali or alkaline earth metal phosphoric acid salts.

7 Claims, No Drawings

STABILIZED ETHYLENE-CARBON MONOXIDE COPOLYMERS

BACKGROUND OF THE INVENTION

This invention relates to ethylene-carbon monoxide copolymers and more particularly to heat stable ethylene-carbon monoxide copolymer compositions.

Ethylene-carbon monoxide copolymers are of considerable interest because of their potential as engineering plastics. These materials have physical properties which are superior to many other materials commonly used in industry and, in addition, offer the advantage of low cost since carbon monoxide is readily available as a by-product in the manufacture of steel and can also be inexpensively prepared from other chemical processes.

In spite of the advantages offered by ethylene-carbon monoxide copolymers they have not attained commercial acceptance partly due to the fact that they have poor resistance to thermal degradation during post polymerization processing operations. Since polymeric end products such as films, sheets and shaped articles are most commonly made by heating and melting polymeric compositions and extruding or injection molding the melt it is very important that these compositions be able to withstand the temperatures encounterd in such post forming operations.

SUMMARY OF THE INVENTION

Ethylene-carbon monoxide copolymer compositions have now been discovered which have greater resistance to thermal degradation. Accordingly, it is an object of the invention to present improved ethylene-carbon monoxide copolymer compositions. It is another object of the invention to present ethylene-carbon monoxide which have improved heat stability. It is another object of the invention to present ethylene-carbon monoxide copolymers which will not undergo serious color degradation during post polymerization processing operations at elevated temperatures. These and other objects of the invention will become more apparent from the description and examples which follow.

In accordance with the present invention, the thermal stability of ethylene-carbon monoxide copolymers is significantly improved by incorporating therein a small amount of a dihydrogen phosphoric acid salt of an alkali or alkaline earth metal. The preferred salts are $NaH_2PO_4$ and $KH_2PO_4$.

DESCRIPTION OF THE INVENTION

The molecular weight and chemical constitution of the ethylene-carbon monoxide copolymers treated in accordance with the invention are not critical and in general any ethylene-carbon monoxide copolymers can be stabilized by the disclosed stabilizers. The following details are intended to be descriptive and not limitative. The ethylene-carbon monoxide copolymer compositions most improved by the stabilizers of the invention are those having molecular weights in the range of about 500 to 50,000 or more and containing up to 50 weight percent carbon monoxide. The most useful ethylene-carbon monoxide copolymers contain about 1 to 50 weight percent carbon monoxide. As can be readily appreciated, the copolymer compositions may contain additional polymeric components which may be either physically admixed with the ethylene-carbon monoxide copolymer or chemically combined with the ethylene and carbon monoxide as components of the copolymer. Monomers which may be copolymerized with the ethylene and carbon monoxide include ethylenically unsaturated aliphatic or aromatic compounds including olefins, such as propylene, isobutylene, etc.; dienes such as butadiene, isoprene, etc.; acrylic monomers such as acrylic acid, methyl methaacrylate, acrylonitrile, etc.; aromatic compounds such as styrene, vinyl toluene, etc. The additional polymeric component is usually present in amounts up to about 50% by weight.

The preparation of ethylene-carbon monoxide copolymers is well known and is described in detail in U.S. Pat. Nos. 2,495,286; 2,641,590; 3,083,184; 3,530,109; 3,694,412; and 3,689,460.

The phosphoric acid salts found to stabilize ethylene-carbon monoxide copolymers are the dihydrogen alkali or alkaline earth salts of phosphoric acid. Exemplary of the acid salts suitable for use in the invention are alkali metal salts such as $LiH_2PO_4$, $NaH_2PO_4$, $KH_2PO_4$; and alkaline earth metal salts such as $Mg(H_2PO_4)_2$, $Ca(H_2PO_4)_2$, $Sr(H_2PO_4)_2$, and $Ba(H_2PO_4)$. The preferred stabilizers are $NaH_2PO_4$ and $KH_2PO_4$.

The dihydrogen phosphoric acid salts are effective in amounts of about 0.1 to about 20%, based on the total weight of ethylene-carbon monoxide copolymer in the composition. The preferred concentration of acid salt in the composition is about 1 to 10% based on the total weight of ethylene-carbon monoxide present in the composition.

The dihydrogen phosphoric acid salts may be used in combination with other stabilizers or antioxidants if desired. The amount of other stabilizer or antioxidant used in the composition may vary over the same range as the acid salts, i.e., about 0.1 to 20% and preferably about 1 to 10% based on the weight of ethylene-carbon monoxide in the polymeric composition.

The stabilizer or mixture of stabilizers can be incorporated into the compositions by any of the known methods. For instance, they may be incorporated into the polymerization mixture prior to or during the polymerization. This method has the advantage of stabilizing the polymer from the time it is formed. The stabilizers can also be incorporated into the polymer after the polymerization is completed. This is most conveniently accomplished by blending the stabilizer into the copolymer which is usually in the form of a melt or fine particles. The stabilizer may be incorporated into the copolymer composition in the form of a powder or dissolved in a solvent. The method of incorporating the stabilizers into the copolymer composition is not considered to be critical.

Other additives such as fillers, extenders, plasticizers, coloring agents, other polymeric materials, etc. can be added to the copolymer compositions being stabilized. These are usually most conveniently added to the polymer after the polymerization.

The following examples illustrate specific examples of the invention. Unless otherwise indicated, parts and percentages are on a weight basis.

EXAMPLE I

A sample ethylene-carbon monoxide copolymer containing 47.11% by weight carbon monoxide is placed on a Fisher-Johns melting point block set at 250°C. and the melting is observed. After 5 minutes the melted polymer is examined and observed to have a dark orange color and exhibit gelling and surface skin formation.

EXAMPLE II

A sample of the same ethylene-carbon monoxide copolymer used in Example I is ground with 2.0% based on the weight of copolymer of $NaH_2PO_4.H_2O$ and placed on a Fisher Johns melting point block set at 250°C. and the melting observed. After five minutes the melted polymer is examined and observed to have a light yellow color and no gelling or surface skin formation.

EXAMPLE III

A one liter Parr Instrument Company reactor (Model 4521) is charged with 500 ml of dioxane, 1 gm of dicyclohexylperoxycarbonate and 3 gm of $KH_2PO_4$. The reactor is purged with nitrogen gas for 45 minutes after it is sealed and then pressurized to 1010 psig with a 50/50 mixture of ethylene and carbon monoxide. The contents of the reactor are maintained between 27° and 33°C. for 19 hours and 35 minutes during which time the reactor pressure is maintained between 880 and 1035 psig by periodically repressurizing the reactor with the ethylene-carbon monoxide gas mixture. The reactor contents are then cooled to room temperature, the reactor is depressurized and the contents are removed. The product is washed with acetone and dried. It has a melting range of 200°–205°C. Using the thermal stability test, described in Example I, the melted polymer has a light yellow color and shows no gelling or surface skin formation.

EXAMPLE IV

A 1 liter Parr Instrument reactor (Model 4521) is charged with 500 ml. of dioxane, 1 gm. of tertiary butyl peroxypivalate and 8 gm. of $NaH_2PO_4.H_2O$. The reactor is surged with nitrogen gas for 45 minutes after it is sealed. It is then pressurized to 1095 psig with a 50/50 mixture of ethylene and carbon monoxide. The contents of the reactor are heated and maintained between 45° and 68°C for 20 hrs. and 20 minutes during which time the reactor pressure is maintained between 820 and 1230 psig by periodically repressurizing the reactor with ethylene-carbon monoxide mixture. The reactor contents are then cooled to room temperature, the reactor is depressurized and the contents removed. The product is washed with acetone and dried. It has a melting range of 195-200°C. The product is tested according to the thermal stability test described in Example I. The polymer after heating is light yellow in color and shows no gelling or surface skin formation.

EXAMPLE V

A 1 liter Parr Instrument reactor (Model 4521) is charged with 500 ml of propylene oxide, 1 gm. of dicyclohexylperoxycarbonate and 3 gm. $KH_2PO_4$. The reactor is sealed and purged with nitrogen gas for 40 minutes. It is then pressured to 1005 psig with a 50/50 mixture of ethylene and carbon monoxide. The contents of the reactor are maintained at a temperature between 19° and 37°C. for 23 hours and 20 minutes during which time the pressure is maintained between 660 and 1015 psig by periodically repressuring the reactor with ethylene-carbon monoxide mixture. The reactor contents are then cooled to room temperature, the reactor depressurized and the contents removed. The product is washed with normal hexane and dried. It is snow white and has a melting range of 200°–205°C. The product is tested according to the thermal stability test described in Example I. The polymer after heating is light yellow in color.

EXAMPLE VI

The procedure of Example I is repeated except that $KH_2PO_4$ is substituted for the $NaH_2PO_4$ on an equal weight basis. The resulting product will have a light color and exhibit little or no gel or skin formation.

EXAMPLE VII

The procedure of Example I is repeated except that $Ba(H_2PO_4)_2$ is substituted for the $NaH_2PO_4$ on an equal weight basis. The resulting product will have a light color and exhibit little or no gel or skin formation.

Examples II to VI illustrate the improved color stability, gel, and skin formation resistance obtained when various alkali and alkaline earth metal dihydrogen phosphate salts are blended into an ethylene-carbon monoxide copolymer. Example I is a stabilizer-free control. Examples III to V illustrate the improved stability of ethylene-carbon monoxide copolymers which are prepared in the presence of the stabilizers of the invention.

Although the invention is described with particular reference to specific embodiments, the scope of the invention is not limited thereto but is defined by the breadth of the appended claims.

I claim:

1. A stabilized ethylene-carbon monoxide copolymer composition containing about 0.1 to 20% based on the weight of polymer in the base composition of a dihydrogen phosphoric acid salt of an alkali or alkaline earth metal.

2. The composition of claim 1 wherein said dihydrogen phosphoric acid salt is present in an amount of about 1 to 10% based on the weight of polymer in the composition.

3. The composition of claim 1 wherein said dihydrogen phosphoric acid salt is selected from the group consisting of $LiH_2PO_4$, $NaH_2PO_4$, $KH_2PO_4$, $Mg(H_2PO_4)_2$, $Ca(H_2PO_4)_2$, $Sr(H_2PO_4)_2$ and $Ba(H_2PO_4)_2$.

4. The composition of claim 1 wherein said dihydrogen phosphoric acid salt is of a metal of Group IA of the periodic table.

5. The composition of claim 1 wherein said monobasic phosphate salt is $NaH_2PO_4$ or $KH_2PO_4$.

6. The composition of claim 1 containing about 0.1 to 20% of a second stabilizer.

7. A stabilized ethylene-carbon monoxide copolymer composition containing about 1 to 10% of a stabilizer selected from the group consisting of $NaH_2PO_4$ and $KH_2PO_4$.

* * * * *